US008769260B1

(12) United States Patent  
Kwan et al.

(10) Patent No.: US 8,769,260 B1
(45) Date of Patent: Jul. 1, 2014

(54) MESSAGING SYSTEM WITH USER-FRIENDLY ENCRYPTION AND DECRYPTION

(75) Inventors: Philip Kwan, San Jose, CA (US); Michael Harry Palmer, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 36 days.

(21) Appl. No.: 13/443,337

(22) Filed: Apr. 10, 2012

(51) Int. Cl.
  *H04L 29/06* (2006.01)
  *G06F 21/00* (2013.01)

(52) U.S. Cl.
  USPC .................... 713/153; 713/193; 709/206

(58) Field of Classification Search
  None
  See application file for complete search history.

(56) References Cited

U.S. PATENT DOCUMENTS

| | | | |
|---|---|---|---|
| 6,625,734 | B1 | 9/2003 | Marvit et al. |
| 6,904,521 | B1 | 6/2005 | Jivsov |
| 7,263,619 | B1 * | 8/2007 | Kim .............................. 713/194 |
| 2002/0112168 | A1 * | 8/2002 | Filipi-Martin et al. ....... 713/183 |
| 2002/0138745 | A1 * | 9/2002 | Cognigni et al. ............. 713/189 |
| 2005/0071632 | A1 * | 3/2005 | Pauker et al. ................. 713/165 |
| 2005/0138353 | A1 | 6/2005 | Spies et al. |
| 2006/0075228 | A1 * | 4/2006 | Black et al. ................... 713/167 |
| 2007/0174636 | A1 * | 7/2007 | Raja .............................. 713/189 |
| 2007/0183600 | A1 | 8/2007 | Smart |
| 2008/0065878 | A1 * | 3/2008 | Hutson et al. ................ 713/153 |
| 2010/0046757 | A1 | 2/2010 | Dancer et al. |

FOREIGN PATENT DOCUMENTS

| | | |
|---|---|---|
| EP | 1 646 194 | 4/2006 |
| FR | 2 839 406 | 11/2003 |
| JP | 11-340965 | 12/1999 |

OTHER PUBLICATIONS

Hushmail—Free Email with Privacy, 1 sheet [retrieved on Mar. 27, 2012], retrieved from the internet http://www.hushmail.com.
AES text encryptor—ENCIPHER.IT AES Text encryptor for Google Mail or anything else, 3 sheets [retrieved on Mar. 27, 2012], retrieved from the internet https://encipher.it/.
FireGPG—Welcome to the official websit of FireGPG!, 4 sheets [retrieved on Mar. 27, 2012], retrieved from the internet http://getfiregpg.org/s/home.
GNU Privacy Guard—From Wikipedia, the free encyclopedia, 4 sheets [retrieved on Mar. 27, 2012], retrieved from the internet http://en.wikipedia.org/wiki/GNU_Privacy_Guard.
Noel McCullagh "Securing E-Mail with Identity-Based Encryption", May-Jun. 2005, 4 sheets, IT Professional, IEEE vol. 7, Issue 3.

* cited by examiner

*Primary Examiner* — Gilberto Barron, Jr.
*Assistant Examiner* — David Le
(74) *Attorney, Agent, or Firm* — Okamoto & Benedicto LLP (57) ABSTRACT

Encryption of message content of an e-mail sent by way of a webmail service may be performed in response to activation of a user interface element. The message content may be encrypted using a symmetric key. A public key of a recipient of the e-mail is received from a backend service and employed to encrypt the symmetric key. The encrypted symmetric key and encrypted message content are sent to a recipient by way of the webmail service. Decryption of the encrypted message content may be performed in response to activation of another user interface element. A private key of the recipient is received from the backend service and employed to decrypt the encrypted symmetric key. The symmetric key is thereafter employed to decrypt the encrypted message content.

17 Claims, 8 Drawing Sheets

MESSAGING SYSTEM WITH USER-FRIENDLY ENCRYPTION AND DECRYPTION

BACKGROUND OF THE INVENTION

1. Field of the Invention

The present invention relates generally to computer security, and more particularly but not exclusively to methods and apparatus for encrypting and decrypting messages.

2. Description of the Background Art

Webmail (or Web-based e-mail) is an e-mail service intended to be primarily accessed via a web browser as opposed to through a desktop e-mail client. Webmail is available from a variety of providers including HOTMAIL, YAHOO! MAIL, and GMAIL webmail services. Webmail is very popular because it is typically provided at no cost to the user and is relatively simple to access, only requiring a computer with a web browser and access to the Internet. However, privacy remains a major concern when using a webmail service. In particular, the webmail service provider has full access to the e-mails and, since webmail is generally accessible over the Internet, hackers may break into the webmail.

Encryption techniques may be employed to prevent unauthorized access to e-mails. Unfortunately, existing encryption solutions are not user-friendly. For example, Pretty Good Privacy (PGP) encryption requires manual exchange of Public Key Infrastructure (PKI) public key before encrypted communication can take place. Existing encryption solutions also require the users to manage cryptographic keys. Because of the difficulty involved in encrypting an e-mail and because a lot of users are not comfortable with computer operations, e-mail encryption is not widely adopted. The above problems are exacerbated when using webmail because webmail is expected to be simple to access and is typically accessed using a web browser.

SUMMARY

In one embodiment, a messaging system includes a backend system hosting a backend service for maintaining a public key and a private key pair of a first user of a recipient computer, and a sender computer configured to receive the public key of the first user from the backend system, to encrypt a message content of an e-mail addressed to the first user using a symmetric key to generate an encrypted message content, to encrypt the symmetric key using the public key of the first user to generate an encrypted symmetric key, to insert the encrypted message content and the encrypted symmetric key into the e-mail, and to send the e-mail to the recipient computer by way of a webmail service.

In another embodiment, a method of encrypting and decrypting messages includes inserting a first user interface element in a webmail application displaying an e-mail in a sender computer. In response to detecting activation of the first user interface element, a message content of the e-mail is encrypted using a first key to generate an encrypted message content, a second key is received from a backend service, the second key is used to encrypt the first key to generate an encrypted first key, and the encrypted message content and the encrypted first key is inserted in the e-mail. The e-mail is sent to a recipient by way of a webmail service.

In another embodiment, a method of encrypting and decrypting messages includes extracting message content from a message in a first computer. A symmetric key is used to encrypt the message content to generate an encrypted message content. A public key of a recipient of the message is received from a backend system. The public key of the recipient is used to encrypt the symmetric key to generate an encrypted symmetric key. The encrypted message content and the encrypted symmetric key are sent to the recipient.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Embodiments of the present invention are described in the context of a webmail service for illustration purposes only. In light of the present disclosure, persons of ordinary skill in the art will readily recognize that embodiments of the present invention may be employed in other web browser/webpage based messaging including social networks (e.g., FACEBOOK site) and in messaging systems in general (e.g., short message service).

Figure 1:
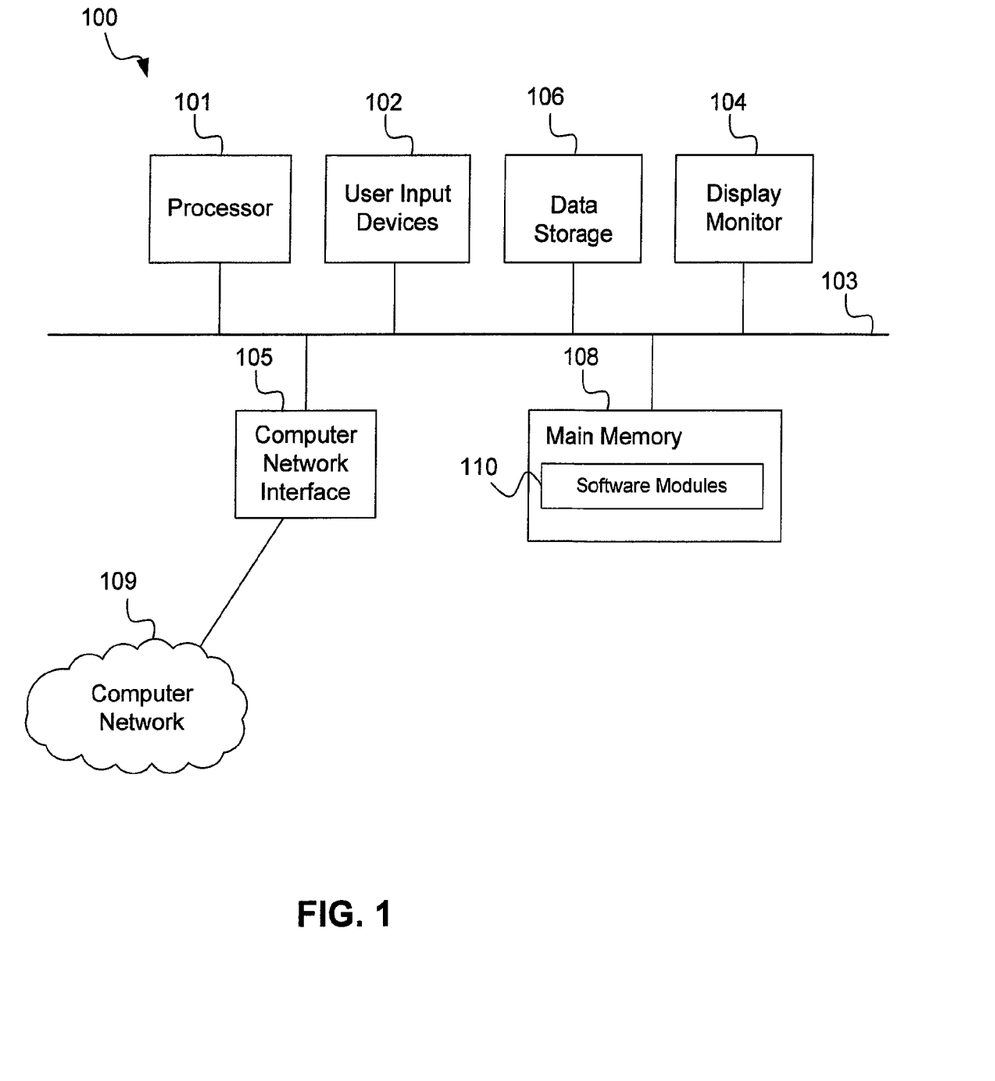
FIG. 1 shows a schematic diagram of a computer that may be employed with embodiments of the present invention.

Referring now to FIG. 1, there is shown a schematic diagram of a computer 100 that may be employed with embodiments of the present invention. The computer 100 may be employed as any of the computers described below. The computer 100 may have fewer or more components to meet the needs of a particular application. The computer 100 may include a processor 101. The computer 100 may have one or more buses 103 coupling its various components. The computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM). The computer network interface 105 may be coupled to a computer network 109, which in this example includes the Internet.

The computer 100 is a particular machine as programmed with software modules 110. The software modules 110 comprise computer-readable program code stored non-transitory in the main memory 108 for execution by the processor 101. As an example, the software modules 110 may comprise a web browser 215, a webmail application 216, and a cipher module 217 when the computer 100 is employed as a user computer, such as a sender computer 201 or a recipient computer 202. As another example, the software modules 110 may comprise a web mail server 213 when the computer 100 is employed as part of a webmail system 204. Yet another example, the software modules 110 may comprise a backend service 214 when the computer 100 is employed as part of a backend system 214.

The computer 100 may be configured to perform its functions by executing the software modules 110. The software modules 110 may be loaded from the data storage device 106 to the main memory 108. The software modules 110 may also be made available on other computer-readable storage medium including optical disk, flash drive, and other memory devices.

Figure 2:
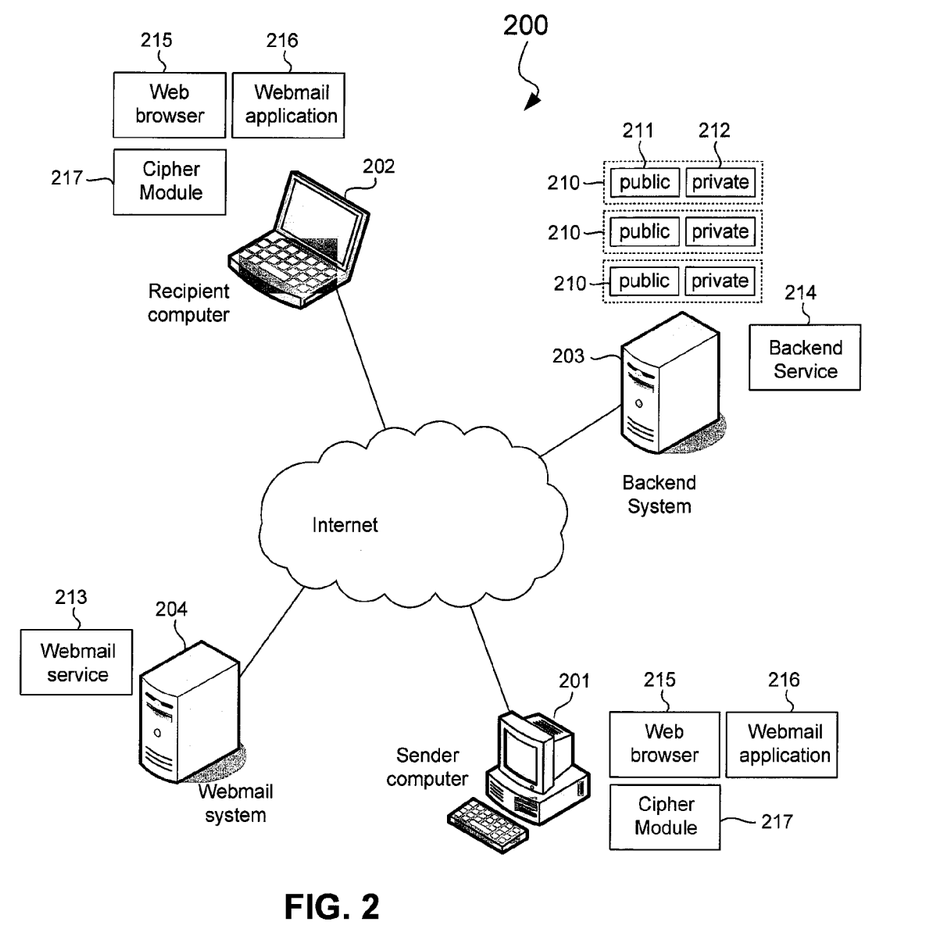
FIG. 2 shows a schematic diagram of a messaging system in accordance with an embodiment of the present invention.

FIG. 2 shows a schematic diagram of a messaging system 200 in accordance with an embodiment of the present invention. In the example of FIG. 2, the messaging system 200 includes the backend system 203, the webmail system 204, and a plurality of user computers, such as the sender computer 201 and the recipient computer 202. The sender computer 201, the recipient computer 202, the backend system 203, and the webmail system 204 may communicate over a computer network, which in this example includes the Internet.

The webmail system 204 may comprise one or more computers hosting a webmail service 213. The webmail service 213 may be a well-known webmail service, such as the HOTMAIL, YAHOO! MAIL, or GMAIL webmail service. Embodiments of the present invention may be employed with a plurality of webmail systems of different webmail service providers, but only one is shown in FIG. 2 for clarity of illustration.

The sender computer 201 and the recipient computer 202 may comprise computers employed by users to connect to a webmail service 213 to access their e-mails. The sender computer 201 and the recipient computer 202 are so labeled simply to indicate which of the computers is sending an e-mail and receiving the e-mail for clarity of illustration. In the following examples, the sender computer 201 sends an e-mail to the recipient computer 202 by way of the webmail service 213. The sender computer 201 and the recipient computer 202 may comprise a desktop, laptop, mobile computing device (e.g., tablets, smart phones), server, or other computing device.

In the example of FIG. 2, the sender computer 201 and the recipient computer 202 each comprises a web browser 215, a webmail application 216, and a cipher module 217. The web browser 215 may comprise a commercially available web browser, such as the MICROSOFT INTERNET EXPLORER, MOZILLA FIREFOX, GOOGLE CHROME, or APPLE SAFARI web browser. The webmail application 216 may comprise computer-readable program code for interacting with the webmail service 213. In one embodiment, the webmail application 216 comprises a webpage served by the webmail service 213.

The cipher module 217 may comprise computer-readable program code for encrypting message content of an e-mail to be sent by way of the webmail service 213 and for decrypting message content of an encrypted e-mail received by way of the webmail service 213. The cipher module 217 may be implemented as a browser extension to the web browser 215. In one embodiment, when sending an e-mail by way of the webmail service 213, the cipher module 217 is configured to retrieve the message content of the e-mail, encrypt the message content using a symmetric key, receive from the backend service 214 the public key of a recipient of the e-mail, encrypt the symmetric key using the public key of the recipient, and send the encrypted message content and encrypted symmetric key to the recipient. In one embodiment, when receiving an encrypted e-mail by way of the webmail service 213, the cipher module 217 is configured to retrieve an encrypted symmetric key and encrypted message content from the encrypted e-mail, receive from the backend service 214 the recipient's private key, decrypt the encrypted symmetric key using the recipient's private key, and decrypt the encrypted message content using the symmetric key.

The backend system 203 may comprise one or more computers hosting the backend service 214. The backend service 214 may comprise computer-readable program code for managing encryption keys for user computers, such as encryption keys for the users of the sender computer 201 and the recipient computer 202. In one embodiment, for user privacy reasons, the backend service 214 does not receive or store the symmetric key used to encrypt the message content of an e-mail. This means that while the backend service 214 has the encryption keys of users, the backend service 214 cannot access the encrypted message content. For data protection, the backend service 214 may communicate with user computers using a secure communication protocol, such as the secure-socket-layer (SSL) protocol.

In one embodiment, the backend service 214 is configured to maintain a PKI key pair 210 for each subscribing user computer. A PKI key pair 210 may comprise a public key 211 and a private key 212. The public key 211 and the private key 212 are asymmetric keys in that the private key 212 is used to decrypt encrypted data encrypted using the public key 211 but the public key 211 and the private key 212 are different keys. That is, in asymmetric encryption, the key used for encryption is different from the key used for decryption. In marked contrast, in symmetric encryption, the same key, which is referred to as "symmetric key," is used for both encryption and decryption.

In the example of FIG. 2, the sender computer 201 and the recipient computer 202 are both subscribed to the backend service 214, and the sender computer 201 is sending an e-mail to the recipient computer 202 by way of the webmail service 213. In that case, the backend service 214 is configured to send to the sender computer 201 the public key 211 of the recipient computer 202 for encrypting the symmetric key used to encrypt the message content of the e-mail, and to send to the recipient computer 202 the private key 212 of the recipient computer 202 for decrypting the encrypted symmetric key, thereby allowing the recipient computer 202 to decrypt the encrypted message content. A subscribing computer may be identified by a matching pair of passphrase and e-mail address. That is, a user's passphrase and e-mail address may be used to authenticate the user and identify that user's public key 211 and private key 212.

Figure 3:
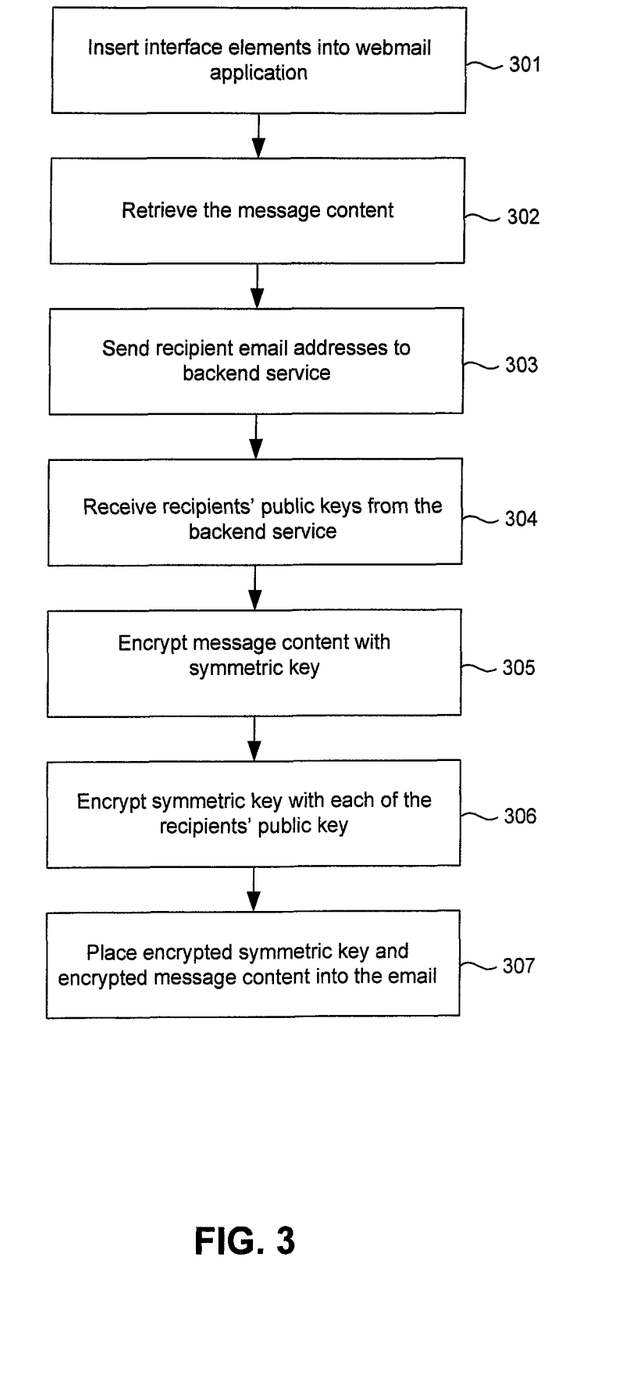
FIG. 3 shows a flow diagram of a computer-implemented method of encrypting a message in accordance with an embodiment of the present invention.

FIG. 3 shows a flow diagram of a computer-implemented method of encrypting a message in accordance with an embodiment of the present invention. The method of FIG. 3 is explained using the components of the system 200 shown in FIG. 2 for illustration purposes only. Other components may also be employed without detracting from the merits of the present invention.

The method of FIG. 3 begins when a user of the sender computer 201 logs onto the webmail service 213 to compose a new webmail e-mail, i.e., an e-mail sent and received by way of a webmail service. The cipher module 217 detects the webmail application 216 that the user employs to access the webmail service 213. In this example, the webmail application 216 comprises a webpage served by the webmail service 213. The web browser 215 renders the webmail application 216 in a browser window (e.g., see browser window 404 of FIG. 6). The browser window is displayed on a display monitor of the sender computer 201. In response to detecting the webmail application 216, the cipher module 217 inserts a user interface element, such as an encrypt button, into the webmail application 216 (step 301). This allows the user to encrypt the e-mail with a single click of the mouse if the user chooses to do so. The user may click on the encrypt button to encrypt the message content of the e-mail.

Figure 4:
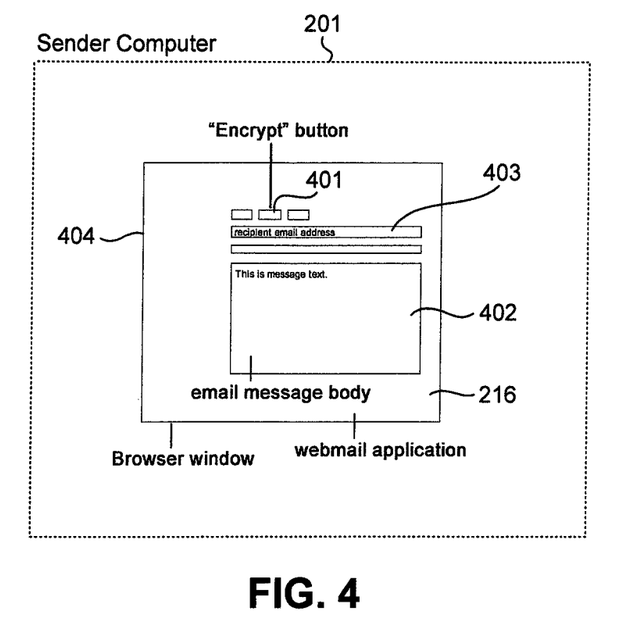
FIGS. 4-6 show a browser window in various stages during encryption of message content in accordance with an embodiment of the present invention.
Figure 5:
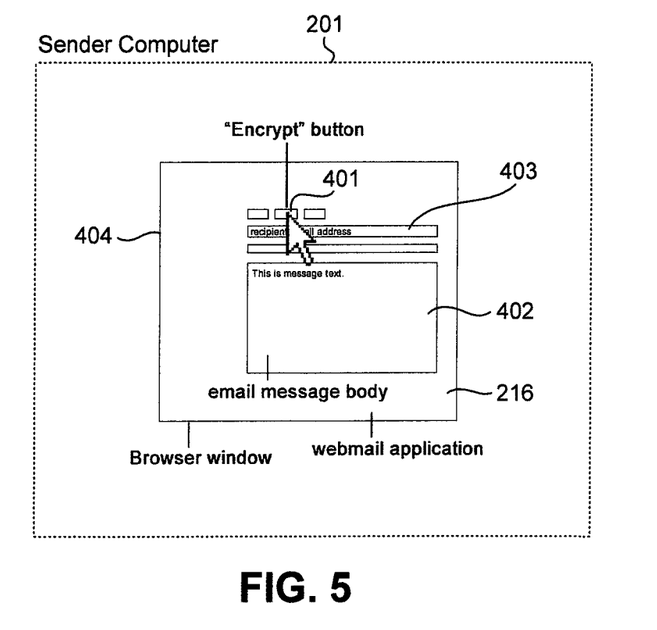

FIG. 4 shows an example browser window 404 of the web browser 215 of the sender computer 201 in accordance with an embodiment of the present invention. In the example of FIG. 4, the cipher module 217 inserts a user interface element in the form of an encrypt button 401 in response to detecting the webmail application 216. The cipher module 217 may insert the encrypt button 401 by modifying the hypertext markup language (HTML) code of the webmail application 216, for example. FIG. 4 also shows the message content, which is "This is a message text.", composed by the user in the e-mail message body 402. The one or more recipients of the e-mail are entered in the recipient address field 403, which is commonly known as the "To:" field. FIG. 5 shows the browser window 404 of FIG. 4 when the user clicks on the encrypt button 401 to initiate encryption of the text in the e-mail message body 402.

Continuing with the method of FIG. 3, the cipher module 217 retrieves the message content of the e-mail when the user activates the encrypt button to initiate encryption (step 302). For example, the cipher module 217 may retrieve the text from the e-mail message body by scraping the document object model (DOM) of the webmail application 216. Screen scraping may be employed to find the text nodes where the user has typed the e-mail message content, allowing extraction of the message content for encryption.

Figure 6:
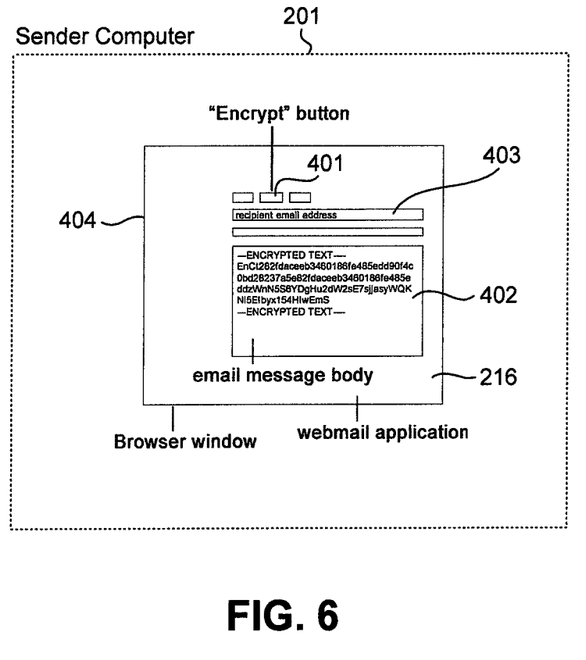

The cipher module 217 retrieves the recipient e-mail addresses from the recipient address field, and sends the recipient e-mail addresses to the backend service 214 (step 303). The backend service 214 retrieves the public key 211 of each recipient e-mail address and provides the public keys 211 to the sender computer 201. In the sender computer 201, the cipher module 217 receives the public keys 211 of the recipients' e-mail addresses (step 304). The cipher module 217 encrypts the message content of the e-mail using a symmetric key (step 305). In contrast to an asymmetric key, the same symmetric key may be used to both encrypt and decrypt the message content. In one embodiment, the symmetric key is randomly generated by the cipher module 217 and the message content of the e-mail is encrypted using the symmetric key in accordance with the Advanced Encryption Standard (AES). The cipher module 217 encrypts the symmetric key with each of the recipients' public key 211 (step 306). That is, the cipher module 217 encrypts the symmetric key with the public key 211 of a first recipient e-mail address, encrypts the symmetric key with the public key 211 of a second recipient e-mail address, and so on. The cipher module 217 then inserts the encrypted symmetric key of each recipient e-mail address and the encrypted message content in the e-mail (step 307), replacing the original (i.e., unencrypted) message content of the e-mail. In one embodiment, the cipher module 217 combines the encrypted message content and the encrypted symmetric key of each recipient e-mail address into a block of text, which is labeled as "ENCRYPTED TEXT" to alert the recipient that the e-mail is encrypted. This is schematically illustrated in FIG. 6, showing the original message content of the e-mail message body 402 as being replaced by encrypted text. The other components shown in FIG. 6 have been previously explained with reference to FIGS. 4 and 5. Thereafter, the e-mail may be sent to the recipients by way of the webmail service 213.

Figure 7:
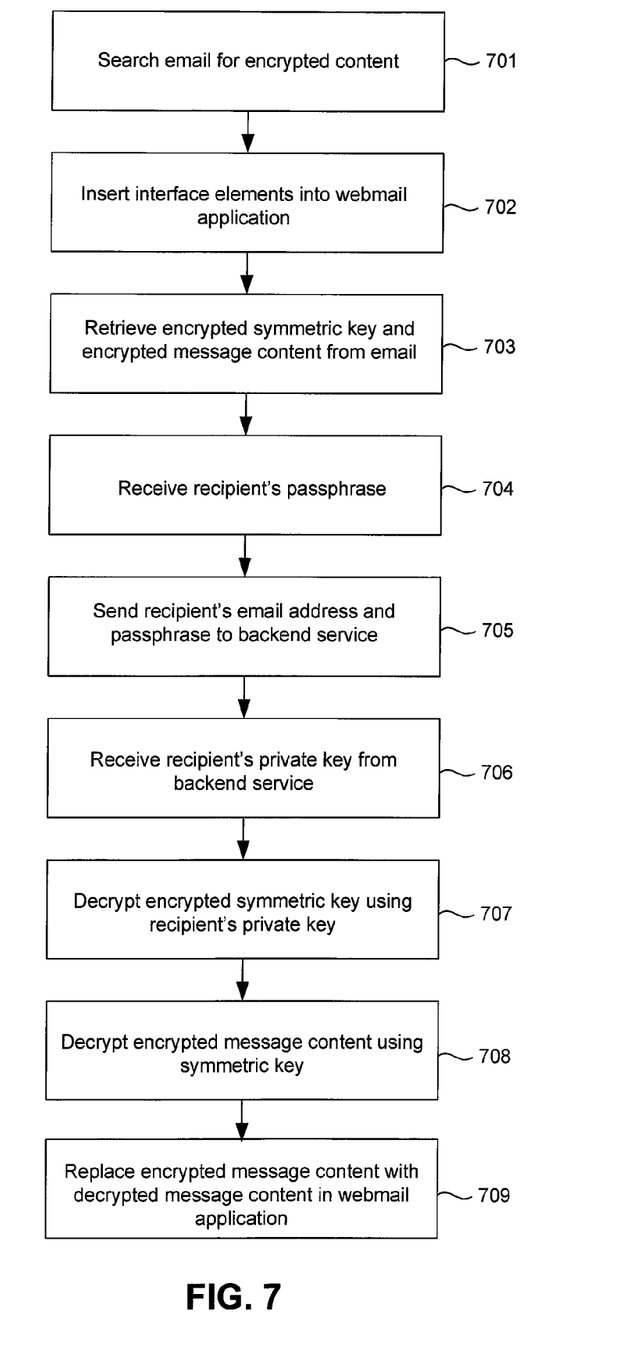
FIG. 7 shows a flow diagram of a method of decrypting encrypted message content in accordance with an embodiment of the present invention.

FIG. 7 shows a flow diagram of a method of decrypting encrypted message content in accordance with an embodiment of the present invention. The method of FIG. 7 is explained using the components of the system 200 shown in FIG. 2 for illustration purposes only. Other components may also be employed without detracting from the merits of the present invention. The method of FIG. 7 may be performed by a recipient computer 202 receiving a webmail e-mail that has been encrypted and sent using the method of FIG. 3.

The example of FIG. 7 assumes that the recipient is subscribed to the backend service 214. If not, a clear text (i.e., unencrypted) message may be included in the webmail email providing instructions on how to subscribe to the backend service 214 and download the cipher module 217 to the recipient computer 202. The clear text instructions may be included by the cipher module 217 of the sender computer 201 in the message body of all encrypted webmail e-mails.

The method of FIG. 7 begins when a cipher module 217 of a recipient computer 202 receives an e-mail in the webmail service 213. The cipher module 217 searches the e-mail for encrypted content (step 701). In this example, the cipher module 217 finds that the e-mail has encrypted message content and encrypted symmetric key for decrypting the encrypted message content because the e-mail has been encrypted in accordance with the method of FIG. 3. In response to detecting encrypted content in the e-mail, the cipher module 217 inserts interface elements, such as a decrypt button, into the webmail application 216 that the user employs to access the webmail service 213 (step 702). In this example, the webmail application 216 comprises a webpage rendered by a web browser 216 in a browser window (e.g., see browser window 804 of FIG. 8). The browser window is displayed on a display monitor of the recipient computer 202.

Figure 8:
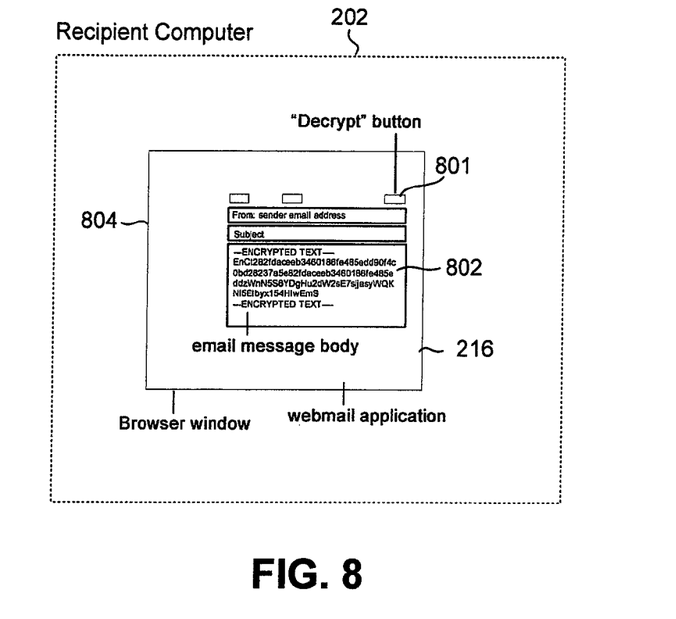
FIGS. 8-10 show a browser window in various stages during decryption of encrypted message content in accordance with an embodiment of the present invention.
Figure 9:
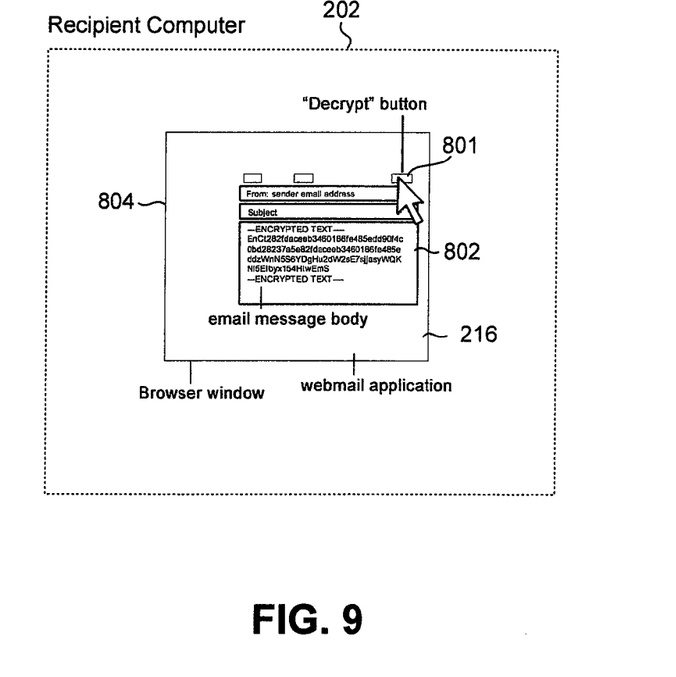

FIG. 8 shows an example browser window 804 of the web browser 215 of the recipient computer 202 in accordance with an embodiment of the present invention. In the example of FIG. 8, the cipher module 217 inserts a user interface element in the form of a decrypt button 801 in response to detecting that the webmail e-mail displayed by the webmail application 216 includes encrypted content. The cipher module 217 may insert the encrypt button 801 by modifying the HTML code of the webmail application 216, for example. FIG. 8 also shows the encrypted message content in the e-mail message body 802. FIG. 9 shows the browser window 804 of FIG. 8 when the user clicks on the decrypt button 801 to initiate decryption of the content of the e-mail message body 802.

Continuing with FIG. 7, the cipher module 217 parses the e-mail message body of the e-mail to retrieve the encrypted symmetric key and the encrypted message content when the user activates the decrypt button (step 703). In one embodiment, in response to the activation of the decrypt button, the cipher module 217 scrapes the document object model of the webmail application 216 to retrieve the message digest of the e-mail, and thus the encrypted symmetric key and the encrypted message content. The cipher module 217 receives the user's passphrase, e.g., by presenting a user interface to the user, for authentication with the backend service 214 (step 704). The cipher module 217 provides the user's passphrase and e-mail address to the backend service 214 (step 705). The backend service 214 conducts verification of the user's passphrase and e-mail address. If the passphrase and e-mail address match, the backend service 214 returns to the recipient computer 202 a corresponding private key 212 for the matching passphrase and e-mail address. The private key 212 is the private key of the user of the recipient computer 202, and is thus the private key 212 of the recipient in this example.

Figure 10:
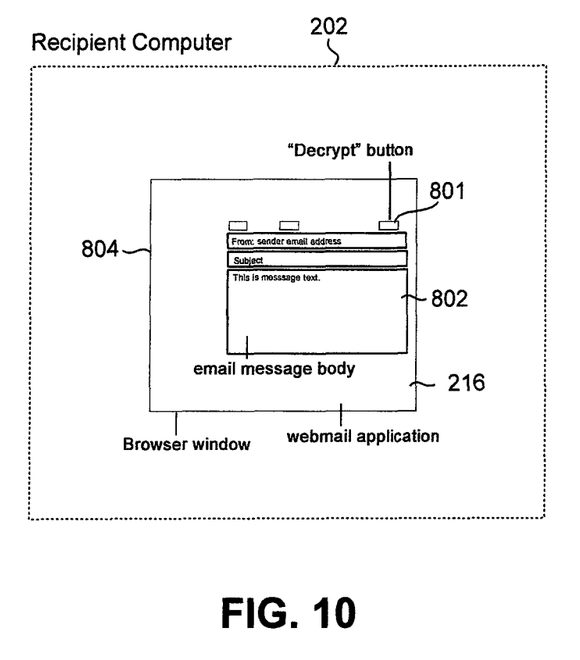

The recipient computer 202 receives the recipient's private key 212 from the backend service 214 (step 706). If the e-mail has more than one encrypted symmetric key, as may be the case when the e-mail has multiple recipients, the cipher module 217 uses the private key 212 received from the backend service 214 to decrypt each of the encrypted symmetric keys until it finds one that can be decrypted using the private key 212. Otherwise, if the e-mail has a single recipient, the cipher module 217 simply decrypts the encrypted symmetric key with the recipient's private key 212 to recover the symmetric key (step 707). The cipher module 217 then uses the symmetric key to decrypt the encrypted message content and thereby recover the message content (step 708). Thereafter, the cipher module 217 inserts the message content into the webmail application 216, replacing the encrypted message content (step 709). This is schematically illustrated in FIG. 10, showing the encrypted message content of the e-mail message body 802 as being replaced by decrypted text, which is "This is message text." The other components shown in FIG. 10 have been previously explained with reference to FIGS. 8 and 9. The decryption process allows the user to view the clear text message.

As can be appreciated from the foregoing, embodiments of the present invention are not limited to encryption of webmail e-mails. That is, embodiments of the present invention may be used with other web-based applications. For example, instead of providing encryption for webmail e-mails, embodiments of the present invention may be used to encrypt postings on social networks, blogs, forums, and other messaging involving web pages. For example, the cipher module 217 may be configured to detect a web page for sending or receiving a message, insert interface elements in the web page to allow the user to initiate encryption or decryption of the message, and perform encryption or decryption of the message using the backend service 214 as previously described. Embodiments of the present invention may also be readily adapted for use with other messaging applications, including SMS.

Embodiments of the present invention provide a user-friendly encryption solution. Unlike other encryption solutions that require the user to go through tedious steps, embodiments of the present invention may be employed with minimal steps, and even with just one mouse click in some implementations. The ease of use removes the hesitancy to employ encryption techniques to protect private communications, making embodiments of the present invention especially advantageous when used with webmail services.

A messaging system with user-friendly encryption and decryption has been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A messaging system comprising:
a backend system hosting a backend service for maintaining a public key and a private key pair of a first user of a recipient computer; and
a sender computer configured to insert an encrypt button on a webpage of a webmail service in response to detecting the webpage being rendered in a web browser displayed on a display monitor of the sender computer, to receive the public key of the first user from the backend system, to retrieve from the webpage a message content of an e-mail addressed to the first user and being composed on the webpage in response to activation of the encrypt button, to encrypt the message content using a symmetric key to generate an encrypted message content, to encrypt the symmetric key using the public key of the first user to generate an encrypted symmetric key, to insert the encrypted message content and the encrypted symmetric key into the e-mail in the webpage, and to send the e-mail to the recipient computer by way of the webmail service.

2. The messaging system of claim 1 further comprising:
the recipient computer configured to receive the e-mail from the webmail service, to search the e-mail for encrypted content, to insert a decrypt button in response to detecting that the e-mail includes encrypted content, to extract the encrypted message content and the encrypted symmetric key from the e-mail in response to activation of the decrypt button, to receive the private key of the first user from the backend system, to decrypt the encrypted symmetric key using the private key of the first user to recover the symmetric key, to use the symmetric key to decrypt the encrypted message content to recover the message content, and to replace the encrypted message content in the e-mail with the message content.

3. The system of claim 2 wherein the backend system is configured to send to the recipient computer the private key of the first user in response to receiving from the recipient computer the recipient e-mail address of the first user.

4. The system of claim 1 wherein the backend system is configured to send to the sender computer the public key of the first user in response to receiving from the sender computer a recipient e-mail address of the first user.

5. The system of claim 1 wherein the sender computer is configured to randomly generate the symmetric key.

6. The system of claim 1 wherein the backend system is configured to store a public key and a private key pair of a second user of the sender computer.

7. A method of encrypting and decrypting messages, the method comprising:
inserting a first user interface element in a webmail application comprising a webpage of a webmail service and displaying an e-mail in a sender computer in response to detecting the webpage of the webmail service;
in response to detecting activation of the first user interface element, retrieving a message content of the email from the webpage, encrypting the message content of the e-mail using a first key to generate an encrypted message content, receiving a second key from a backend service, using the second key to encrypt the first key to generate an encrypted first key, and inserting the encrypted message content and the encrypted first key in the e-mail in the webpage; and
sending the e-mail to a recipient by way of the webmail service.

8. The method of claim 7 further comprising:
receiving the e-mail in a recipient computer of the recipient by way of the webmail service;
searching the e-mail for encrypted content;
inserting a second user interface element in another webpage displaying the e-mail in the recipient computer in response to detecting encrypted content in the e-mail; and
in response to detecting activation of the second user interface element, receiving a third key from the backend service, using the third key to decrypt the encrypted first key to recover the first key, and using the first key to decrypt the encrypted message content to recover the message content.

9. The method of claim 7 wherein the first key is a symmetric key.

10. The method of claim 7 wherein the first key is randomly generated.

11. The method of claim 7 further comprising:
the backend service sending the first key to the sender computer in response to receiving a recipient e-mail address of the recipient from the sender computer.

12. The method of claim 8 wherein the second key and the third key are public key and private key pair of the recipient.

13. The method of claim 8 further comprising:
the backend service sending the third key to the recipient computer in response to receiving a recipient e-mail address of the recipient from the recipient computer.

14. A method of encrypting and decrypting messages, the method comprising:
detecting a webpage of an online service displayed on a display monitor in a first computer;
inserting an encrypt button on the webpage in response to detecting that the webpage is of the online service;
in response to detecting activation of the encrypt button, extracting message content from the webpage;
using a symmetric key to encrypt the message content to generate an encrypted message content;
receiving from a backend system a public key of a recipient of the message;
using the public key of the recipient to encrypt the symmetric key to generate an encrypted symmetric key;
replacing the message content with the encrypted message content in the webpage; and
sending the encrypted message content and the encrypted symmetric key to the recipient.

15. The method of claim 14 further comprising:
receiving the encrypted message content and the encrypted symmetric key in a second computer of the recipient;
receiving from the backend system a private key of the recipient;
using the private key of the recipient to decrypt the encrypted symmetric key to recover the symmetric key; and
using the symmetric key to decrypt the encrypted message content to recover the message content.

16. The method of claim 14 further comprising:
randomly generating the symmetric key in the first computer.

17. The method of claim 14 wherein the message comprises an e-mail sent by way of a webmail service.

* * * * *